Dec. 27, 1949    H. D. LEE    2,492,531
AUTOMOBILE PARKING AID
Filed March 23, 1948    3 Sheets-Sheet 1

INVENTOR.
HAROLD D. LEE.
BY Lancaster, Allwine Rommel
ATTORNEYS.

Dec. 27, 1949  H. D. LEE  2,492,531
AUTOMOBILE PARKING AID
Filed March 23, 1948  3 Sheets-Sheet 2

INVENTOR.
HAROLD D. LEE.
BY *Lancaster, Allwine & Rommel*
ATTORNEYS.

Dec. 27, 1949   H. D. LEE   2,492,531
AUTOMOBILE PARKING AID
Filed March 23, 1948   3 Sheets-Sheet 3
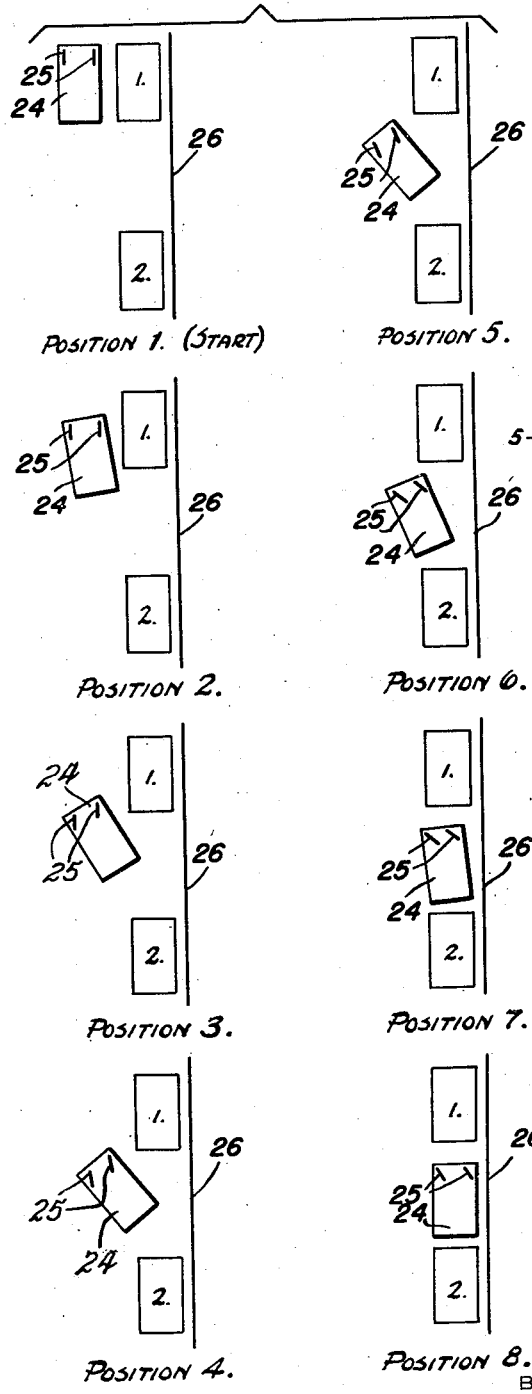
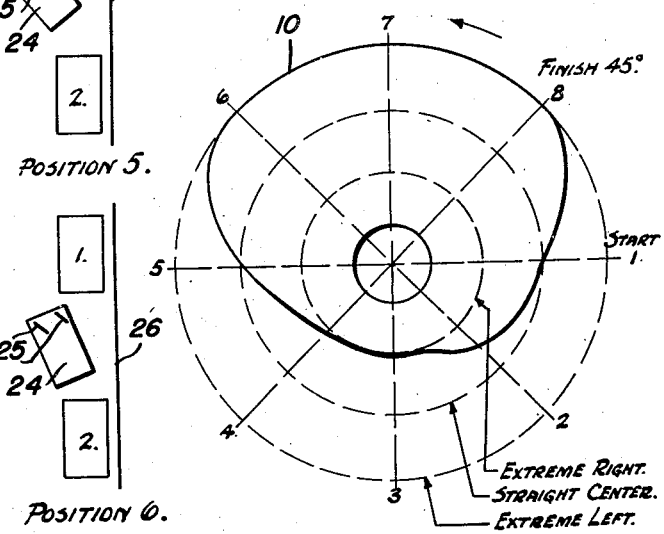
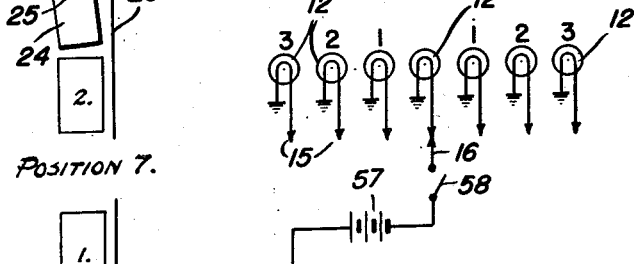
INVENTOR.
HAROLD D. LEE.
BY
ATTORNEYS.

Patented Dec. 27, 1949

2,492,531

UNITED STATES PATENT OFFICE 2,492,531

AUTOMOBILE PARKING AID

Harold D. Lee, Baton Rouge, La.

Application March 23, 1948, Serial No. 16,572

1 Claim. (Cl. 177—311)

This invention relates to an automobile parking aid, that is, an improved indicating device and operating means therefor for facilitating the steering of automobiles into parking spaces parallel with the street curbs.

The principal object of my invention is to provide an indicating device with its operating mechanism controlled by the movement of the vehicle in a manner to guide or indicate the proper steering of the vehicle to park it in a minimum space and so that the highest efficiency in parking maneuvers may be executed repeatedly. This saves time in parking inasmuch as parking following the indicator as a guide is successful on the first attempt and permits parking in very close spaces. As a further advantage, it protects automobiles from damage in parking, such as bent fenders and bumpers from striking curbs as well as protecting side walls of tires from similar damage; and, in general it saves labor, particularly when used by an inexperienced driver.

Other objects, advantages of my invention will appear in the following detailed description of a highly satisfactory embodiment thereof which is illustrated in the accompanying drawings forming a part of this specification.

In the drawings:

Fig. 6 is a series of position diagrams of a car in the act of parking between two parked cars.

Fig. 7 is an enlarged plan of the cam for operating the switches for the indicating signals during parking operations, and Fig. 8 is a simplified circuit diagram of the indicator signal lamps.

Figure 1:
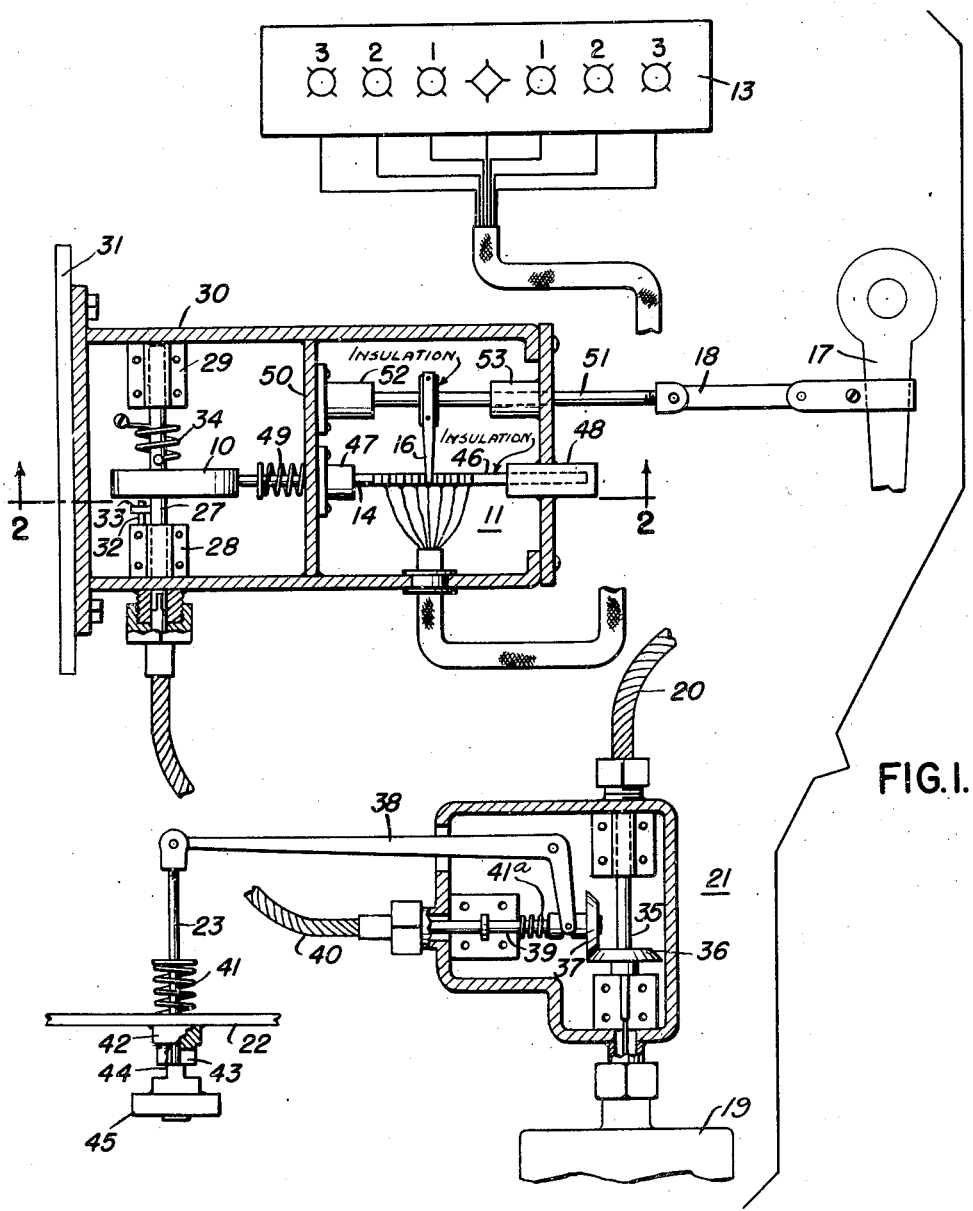
Fig. 1 is a composite diagrammatic view of an automobile parking aid indicator and operating mechanism in accordance with my invention parts being shown in plan and elevation and others in section or broken away.

In general the principle of this invention is to provide mechanism for guiding the steering of an automobile so that each time a car is parked in a minimum space the car wheels are cut to the same pattern—that is, the tracks should all coincide. Accordingly this pattern is patterned in a cam 10 which operates a switch mechanism 11 for operating electric light bulbs 12 on an indicating panel 13 mounted on the dashboard of a car to indicate to the driver which way to turn the steering wheel to make the front wheels correspond to the degree of turn called for by the cam 10. Thus the cam 10 calls for the degree and direction of turn and the indicator lights 12 show what correction must be put to the steering wheel to correct for being off and also indicates which direction to turn steering wheel.

Thus while parking, if cam 10 moves rod 14 and contacts 15 of switch mechanism 11 to the left, so that a first contact beyond the middle contact is engaged by the switch wiper contactor 16 light #1 on the left side will light up. Accordingly the driver will rotate steering wheel in clockwise direction which will rotate car steering arm 17 and through linkage 18 will push the wiper contact 16 to the left so as to place this wiper contact 16 on the middle contact point of switch contacts 15 thus lighting the middle bulb 12 showing in the diamond shaped opening of the indicating panel 13 and indicating that the parking pattern is being followed.

In the drawings the indicating mechanism is illustrated but only so much of the vehicle structure as actually operates in conjunction with the indicating mechanism is fragmentarily illustrated such as the car steering sector 17 above referred to although other parts which move in accordance with the steering movements of the front wheels of the vehicle may be employed in place of this sector. Similarly a portion of the speedometer 19 and its drive cable 20 are illustrated in Fig. 1 as the drive for cam 10 is preferably arranged through a drive take-off 21 interposed between the speedometer 19 and its drive cable 20 although separate drive may be employed apart from the speedometer drive means. Likewise a section 22 of the vehicle instrument panel or the like is shown supporting an operating rod 23 for effecting the operation of the indicating mechanism at the time of parking operations of the vehicle. Aside from these an automobile 24 with its front wheels 25 are diagrammatically indicated in a series of position diagrams in Fig. 6 as it is being parked alongside a curb 26 between two spaced cars numbered 1 and 2.

Cam 10 which effects the operation of the indicator lights is designed for rotation through 315° by the backward movement of the vehicle for the distance required in a parking operation. As shown in Fig. 1 it is fixed on a shaft 27 mounted in bearings 28 and 29 in a casing 30 supporting a vehicle frame member 31 or chassis, bearing 28 having a projecting stop pin 32 adapted to be engaged by a cooperating radial pin 33 carried by shaft 27 when the cam 10 is in its initial or starting position. A spring 34 connected with shaft 27 and casing 30 operates to return cam 10 to such initial starting position after the completion of a parking operation.

The drive for cam 10 is effected through the take-off 21 in the speedometer drive. This take-off is preferably as above stated, in the form of a casing carrying a shaft 35 interposed between the speedometer 19 and its drive cable 20. A bevel gear 36 is fixed on shaft 35 and is adapted to be engaged by a gear 37 preferably through frictional engagement therewith so that when shifted into engagement by a gear shift lever 38 it will be brought immediately into driving relationship. Gear 37 is longitudinally slidably mounted on a stub shaft 39 on the end of a drive cable or the like 40 connected with shaft 27. The ratio of gears 36 and 37 is such that cam 10 will be rotated through the selected angular rotation 315° for the required distance of backward movement for parking a car from a point parallel alongside a parked car, as indicated in parked car 1 in position 1 in Fig. 6. As shown in Fig. 1 gear 37 is in engagement with gear 36, gear shift lever 38 being drawn into position by operating rod 23 against the action of a compression spring 41. A compression spring 41a also acts on gear 37 tending to hold it in positive engagement with gear 36 when actuated to said position by lever 38. Operating rod 23 extends through a bushing 42 mounted on panel 22 and the outer end thereof has a transverse slot 43 therein for receiving a projection 44 on a finger piece 45 rotatably mounted on the end of rod 23. When finger piece 45 is turned so that projection 44 will enter slot 43 spring 41 will operate to retract rod 43 and thus draw gear 37 out of engagement with gear 36. Bevel wheels 36 and 37 are preferably made of steel, one of them having a leather face which provides a high coefficient of friction for a friction drive. This arrangement has the advantage over toothed gears as no damage is done if the driver forgets to disengage the parking lever in driving forward or backward.

This cam 10 is operated or rotated by a cable 40 which is driven by means of the gears 36 and 37 from the speedometer cable 20. These gears are engaged by means of the parking lever 38 actuated by drawing out the finger piece 45 and turning it to an engaging position as shown, when the car is in a position to be backed into a parking space. Thus as car backs, cam 10 is rotated for operating the signal lights in panel 13 as will be described.

Figure 2:
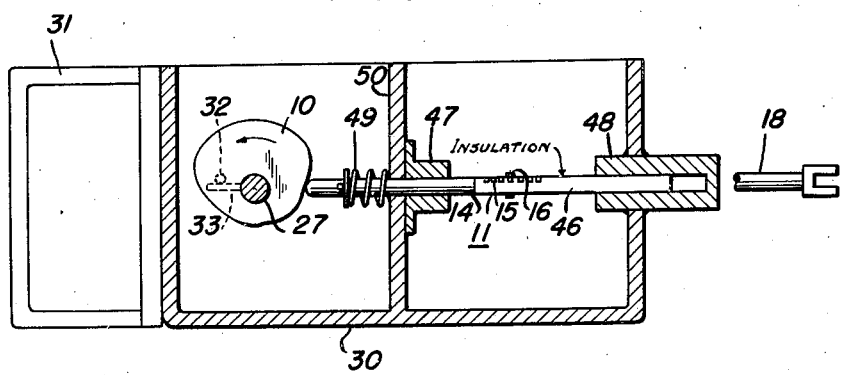
Fig. 2 is a longitudinal sectional view taken substantially on line 2—2 of Fig. 1.
Figure 3:
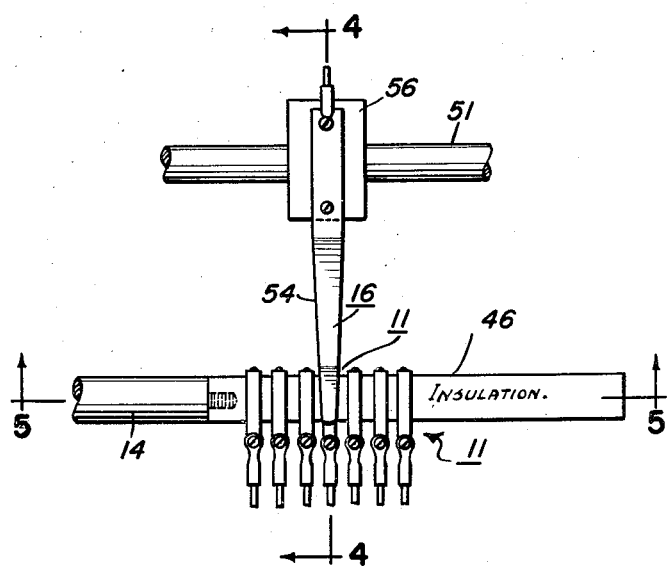
Fig. 3 is an enlarged fragmentary plan view of the indicator switch operating mechanism.
Figure 5:
Fig. 5 is a detail sectional view taken on line 5—5 of Fig. 3.

Rod 14 carrying a square sectioned longitudinal extension 46 in which contacts 15 are embedded as shown in Figs. 3 and 5 is reciprocably mounted in appropriate bearings 47 and 48 as shown in Figs. 1 and 2. A compression spring 49 is mounted so as to engage a partition 50 of casing 30 for urging rod 14 into contacting engagement with the peripheral surface of cam 10. Thus as cam 10 turns the switch contacts 15 are reciprocably moved in accordance with the conformation of the cam.

In Fig. 7 the conformation of cam 10 is shown with respect to the required movements of the steering mechanism of the automobile from straight driving to extreme right and left turning operations. Such turns are indicated by the wheels 25 in the parking of car 24 in eight positions in Fig. 6, such positions 1 to 8 being indicated in the corresponding cam positions in Fig. 7, the development as a whole providing a relatively smoothly curved cam surface joining the corresponding points. Thus it will be seen that during the operation of the indicator mechanism during parking operations the switch operating the switch contacts 15 will be in continuous movement and if the steering of the vehicle is controlled to follow such pattern of movement the parking operation may be successfully accomplished and repeated from time to time.

Figure 4:
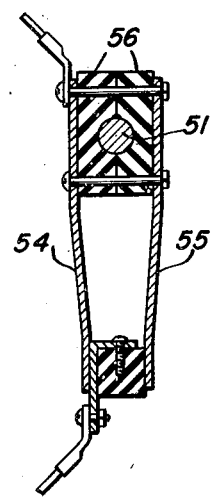
Fig. 4 is a detail sectional view taken on line 4—4 of Fig. 3.

In order to indicate the required steering movements the switch wiper contact 16 is mounted on a rod 51 reciprocably movable through bearings 52 and 53 and connected with linkage 18 with the car steering sector arm 17 as previously referred to. As best shown in Figs 3 and 4 the switch wiper contact 16 preferably comprises a pair of spring leaves 54 and 55 bolted through insulating blocks 56 onto rod 51. If this switch wiper contact 16 is maintained on the middle contact 15 by properly steering the vehicle front wheels (25 in Fig. 6) the parking of the vehicle will follow the prescribed pattern of cam 10. Contacts 15 of switch mechanism 16 are connected with light bulbs 12 as diagrammatically shown in Fig. 8 so as to be energized by battery 57 (the car battery, preferably) so that a selected bulb will be lighted in accordance with the position of wiper contact 16 with respect to contacts 15. Accordingly the indicator lights in panel 13 indicate the position of the steering wheels with respect to the proper steering for parking which should be the middle light. A switch 58 in the circuit is closed when the indicator is used for parking a car; this may be a hand switch so that the indicator can be used to indicate turning movements of the car in normal driving operations though for parking it may be associated with the gear shift lever 38 so to close the circuit when gears 36 and 37 are engaged for a parking operation.

In the use of the indicating device for parking an automobile such as 24 in Fig. 6 with the car stopped approximately even with and parallel to the car 1 in front of the space in which it is desired to park, finger piece 45 is pulled out to a park position engaging gears 36 and 37. The car gear shift lever is positioned in reverse and the car is backed slowly steering the car as directed by the indicator. As long as middle light in the directional panel 13 stays lighted proceed in reverse—but as lights 1, 2, or 3 on either side of center light make contact, center the light by turning steering wheel in the corrective direction. Lights 1 indicate driver is a shade off the pattern. Lights 2 indicate greater deviation from pattern and lights 3 show steering is far off desired pattern.

I claim:

An automobile parking aid comprising indicating means for directing the steering of the automobile while backing into a parking space, means for operating said indicating means so as to indicate when a required pattern of steering in such backward movement is not followed including a pair of independently longitudinally movable members operating adjacent to each other, means for operating one of said members including a rotary cam having a peripheral pattern in accordance with the steering to be followed while parking the automobile from a position parallel with a car parked alongside a curb to a parked position behind said car, driving means including a driving connection with the speedometer drive shaft for rotating said cam in accordance with the rearward movement of the automobile so that the required portion of the cam surface will be presented to be followed as the automobile is moving backward, means comprising a connection with one of the automobile steering arms for moving the other of said members in accordance with the steering of the automobile, said indicating means comprising a plurality of lights, circuits for said lights including a series of contacts, one for each light, operated by one of said movable members and a single contact for cooperating with said series of contacts operated by the other movable member, means for connecting and disconnecting the drive between the speedometer drive shaft and said cam, and spring means acting on said cam for returning it to its initial starting position when the last said means is operated to disconnect the drive of the cam by the speedometer drive shaft.

HAROLD D. LEE.

REFERENCES CITED

The following references are of record in the file of this patent:

UNITED STATES PATENTS

| Number | Name | Date |
| --- | --- | --- |
| 923,511 | Greenbaum | June 1, 1909 |
| 1,809,934 | Glennon | June 16, 1931 |